United States Patent [19]

Gordon

[11] Patent Number: 5,796,802
[45] Date of Patent: Aug. 18, 1998

[54] MULTIPLE ANGLE PRE-SCREENING TOMOGRAPHIC SYSTEMS AND METHODS

[75] Inventor: Bernard M. Gordon, Manchester-by-the-Sea, Mass.

[73] Assignee: Analogic Corporation, Peabody, Mass.

[21] Appl. No.: 908,286

[22] Filed: Aug. 7, 1997

Related U.S. Application Data

[63] Continuation of Ser. No. 699,400, Aug. 19, 1996, abandoned.

[51] Int. Cl.$^6$ .............................. G01N 23/04; A61B 6/03
[52] U.S. Cl. ............................ 378/8; 378/901; 378/57
[58] Field of Search ..................... 364/413.15, 413.16; 378/8, 15, 20, 901, 57

[56] References Cited

U.S. PATENT DOCUMENTS

| | | | |
|---|---|---|---|
| Re. 34,379 | 9/1993 | Gordon | 378/20 |
| 4,031,545 | 6/1977 | Stein et al. | 358/108 |
| 4,759,047 | 7/1988 | Donges et al. | 378/57 |
| 4,884,289 | 11/1989 | Glockmann et al. | 378/57 |
| 5,132,998 | 7/1992 | Tsutsui et al. | 378/99 |
| 5,182,764 | 1/1993 | Peschmann et al. | 378/57 |
| 5,247,561 | 9/1993 | Kotowski | 378/87 |
| 5,319,547 | 6/1994 | Krug et al. | 364/409 |
| 5,367,552 | 11/1994 | Peschmann | 378/57 |
| 5,432,339 | 7/1995 | Gordon et al. | 250/231.13 |
| 5,473,657 | 12/1995 | McKenna | 378/4 |
| 5,490,218 | 2/1996 | Krug et al. | 382/100 |
| 5,499,415 | 3/1996 | McKenna | 5/601 |
| 5,600,700 | 2/1997 | Krug et al. | 378/57 |
| 5,642,393 | 6/1997 | Krug et al. | 378/57 |

FOREIGN PATENT DOCUMENTS

3150306 A1   6/1983   Germany.

OTHER PUBLICATIONS

Alvarez, Robert, E., et al., Phys. Med. Biol. 1976, vol. 21, Nol. 5, "Energy-selective Reconstructions In X-ray Computerized Tomography", pp. 733-744.

*Primary Examiner*—David P. Porta
*Assistant Examiner*—David Vernon Bruce
*Attorney, Agent, or Firm*—Lappin & Kusmer LLP

[57] ABSTRACT

A multiple angle tomographic system includes a rotating gantry with a source, e.g., an x-ray source, and detector array combination mounted thereon so as to acquire a plurality of projections of objects passing through the gantry. A pre-screen subsystem utilizes a subset of the projections from those that can be acquired during a full scan so as to define a first plurality of projections—e.g., eight projections—that are sufficient analyze whether there is a likelihood that a targeted object, e.g., a firearm and/or plastic explosives is present. If there is a likelihood that a targeted object is present, a full-image CT reconstruction is commanded, automatically or manually, so as to verify and more fully assess the detected object. This combination of pre-screen and selective full-image CT reconstruction provides thorough inspection of closed containers, e.g., passenger luggage, by providing multiple angle and perspective viewing of targeted objects.

24 Claims, 9 Drawing Sheets

(1)

(2)

(3)

1

MULTIPLE ANGLE PRE-SCREENING TOMOGRAPHIC SYSTEMS AND METHODS

This is a continuation of application Ser. No. 08/699,400 filed on Aug. 19, 1996 now abandoned.

FIELD OF THE INVENTION

The invention relates generally to high speed scanning, and more particulary to a computed tomography (CT) system which includes pre-screening processing using select projection image data for beneficial use in identifying specific locations of interest, for subsequent CT imaging.

BACKGROUND OF THE INVENTION

The Federal Aviation Administration (FAA) and other similar agencies throughout the world have the daunting task of identifying dangerous devices and/or contraband within passenger baggage and within a time-frame that will not generally impede passenger travel time. Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates a stationary X-ray beam that passes through and is partially attenuated by the baggage, as the baggage is moved into and positioned within the beam, before being received by the detector array. During each measuring interval, each detector of the detector array generates data representative of the integral of the density of the planar segment of the baggage through which the detected portion of the X-ray beam passes. The data acquired by the detector array during each measuring interval is used to form one or more raster lines of a two dimensional image. As the conveyor belt transports the baggage past the stationary source and detector array, the scanner generates a two dimensional image representative of the density of the baggage, as viewed by the stationary detector array. The density image is typically displayed for analysis by a human operator.

However, the complexity of materials used by terrorists and others in violation of the governing laws and safety guidelines is growing rapidly, and continues to reduce the likelihood of successful detection by existing airport scanners and security devices. Plastic explosives, for example, present a particular challenge to baggage scanning systems because, due to their moldable nature, plastic explosives may be formed into geometric shapes that are difficult to detect. Identifying baggage suspected of containing such materials, therefore, requires very attentive operators. The requirement for such attentiveness can result in greater operator fatigue, and fatigue as well as any distractions can result in a suspected bag passing through the system undetected. Even with careful attention, such materials may go undetected.

One reason for this uncertainty is that the line scanner provides a stationary beam of X-rays of a predetermined spectra directed in only one direction through the baggage, and thus this is the only direction through which the baggage is examined. Because the absorption of X-rays is a function of the integral of the density of all of the materials through which the beam passes, the stationary beam may not only pass through a sheet of plastic explosive, but also pass simultaneously through other objects of greater density positioned with the sheet of explosive along the path of the beam making it extremely difficult to detect the plastic sheet. Thus, a single orientation X-ray image of an object within an item of baggage does not readily permit spatial or other differentiation between the targeted object and the objects lying in the same x-ray path.

Further, if a targeted object such as a sheet of explosive is not substantially symmetric about three-dimensional space, like a ball or cube, the likelihood of identifying that object with the line scanner depends upon the orientation of the object relative to the scan orientation. For example, a thin sheet of plastic explosive may be extremely difficult to recognize if it is oriented so that its height and width dimensions are oriented parallel to the X-ray beam, and so that only its thickness dimension is exposed to the beam. Then only a thin object, e.g., a few millimeters thick, will be imaged, and depending on the resolution of the system may be virtually impossible to detect. On the other hand, the same sheet when spread across the entire inside surface of a bag exposed to the beam may appear simply as a part of the bag because of its low density.

Accordingly, a great deal of effort has been made to design a feasible X-ray baggage scanner for providing greater detection of suspect objects and materials. Such designs, for example, have been described in U.S. Pat. Nos. 4,759,047 (Donges et al.); 4,884,289 (Glockmann et al.); 5,132,988 (Tsutsui et al.); 5,182,764 (Peschmann et al.); 5,247,561 (Kotowski); 5,319,547 (Krug et al.); 5,367,552 (Peschmann et al.); 5,490,218 (Krug et al.) and German Offenlegungsschrift DE 31 503 06 A1 (Heimann GmbH).

U.S. Pat. No. 4,884,289 (Glockmann et al.), for example, discloses an x-ray scanner, similar to a line scanner, which generates a stationary fan-shaped x-ray beam through which baggage passes on a conveyor. In addition to an array of detectors for detecting the partially attenuated beam as it passes through an item of baggage, the scanner also includes multiple detectors positioned for measuring scattered components of the beam from each item of the baggage as the item passes through the beam. The partially attenuated and scattered components are subsequently used to identify, through computer processing, plastic articles, and in particular, plastic explosives disposed in the baggage.

It has been suggested to use X-ray CT as a part of a baggage scanner to identify objects within baggage positioned in the scanner. At least one of these designs, described in U.S. Pat. Nos. 5,182,764 (Peschmann et al.) and 5,367,552 (Peschmann et al.) (hereinafter the '764 and '552 Patents), has been commercially developed and is referred hereinafter as the "In Vision Machine". The In Vision Machine includes a CT scanner of the third generation type. Third generation type CT scanners are particularly useful in the medical arts and are often used for imaging sections of the human body. Third generation scanners typically include an X-ray source and an X-ray detector system secured respectively to diametrically opposite sides of an annular-shaped gantry platform or disk. The gantry disk is rotatably mounted within a gantry support so that in operation the disk continuously rotates about a rotation axis while X-rays pass from the source through an object positioned within the opening of the disk to the detector system.

In the typical third generation machine, the detector system includes a linear array of detectors disposed as a single row in the shape of a circular arc having a center of curvature at the focal spot of the X-ray source (i.e., the point within the X-ray source from which the X-rays emanate). The X-ray source generates a fan shaped beam, or fan beam, of X-rays that emanates from the focal spot, passes through a planar imaging field, and is received by the detectors. As is well known, a coordinate system is defined by X-, Y- and Z-axes, wherein the axes and are all normal to one another and intersect at the "isocenter" (the center of rotation of the disk as the disk rotates about the rotation axis). The Z-axis is defined by the rotation axis and the X- and Y-axes are defined by and lie within the planar imaging field. The fan beam is thus defined as the volume of space between a point source (i.e., the focal spot) and the receiving surfaces of the detectors of the detector array exposed to the X-ray beam. Because the dimension of the receiving surfaces of the linear array of detectors is relatively small in the Z-axis direction, the fan beam is relatively thin in that direction. Each detector generates an output signal representative of the intensity of the X-rays incident on that detector during a measuring interval. Since the X-rays are partially attenuated by all the mass in their path, the output signal generated by each detector is thus a function of the density of all the mass disposed in the imaging field between the X-ray source and that detector during a measuring interval.

As the gantry disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection", and the angular orientation of the X-ray source (and in particular the focal spot) during generation of a projection is referred to as the "projection angle". At each projection angle, the possible path of the X-rays from the focal spot to each detector, called a "ray" path, increases in cross section from a point source to the receiving surface area of the detector, and thus is thought to "magnify" the density measurement because the receiving surface area of the detector area is larger than any cross sectional area of the object through which the ray passes. As the disk rotates around the object being scanned, the scanner generates a plurality of projections at a corresponding plurality of projection angles. Using well known algorithms a CT image of the object may be generated or "reconstructed" from all the projection data collected at the projection angles. The CT image is representative of the density of a two dimensional "slice" of the object, through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam.

When employing CT imaging for baggage scanning, physical attributes of the object, such as density, shape and texture, can be identified. These attributes can thereafter be used to automatically identify the object through computerized comparisons, and/or to display a reconstructed image on a display terminal for analysis by a professional security specialist.

However, one important design criteria for a baggage scanner is the speed with which the scanner can scan an item of baggage. To be of practical utility in any major airport, a baggage scanner should be capable of scanning a large number of bags at a very fast rate, e.g., on the order of 300 bags per hour or faster, and to provide this rate the scanner must scan an average sized bag at a rate of about 12 seconds per bag or less. Currently, the FAA's desired throughput rate is about 675 bags per hour, allowing about 5.3 seconds to scan each bag. For this reason one problem with relying solely on a prior art CT scanner (of the type described in the '764 and the '552 Patents) to acquire all of the data relating to each bag is that the scanners would require an unreasonable amount of time to scan an entire bag. A CT scanner for providing, for example, 1440 projection views with a single array of 384 detectors with each 360° rotation of the gantry disk, will generate 384×1440 (552960) separate data measurements for each 360° rotation of the gantry disk. Thus, in the example given, 552,960 data measurements are used to reconstruct a single CT image. In addition, from about 0.6 to about 2.0 seconds are required to rotate the gantry disk one revolution and to acquire sufficient data for a CT image of a single slice through the object. With a detector system comprising only a single array, volumetric scans requiring multiple rotations of the gantry disk require even more time. Further, the better the required resolution of the CT-generated image, i.e., the thinner the volume or slice through which the beam is directed through the bag for each image, the greater the number of slices that are required in order to scan the entire volume of each item of luggage passing through the scanner and the greater amount of processing that is required to process the incoming data. For baggage scanning, the X-ray CT scanner should provide images of sufficient resolution to detect plastic explosives on the order of only a few millimeters thick. If 0.6 to 2.0 seconds are required for generation of data for each CT image, at the desired throughput rate of 300 bags per hour a conventional CT baggage scanner can only afford to generate an average of six or seven CT images per bag. With the average bag assumed to be about 70 cm long, clearly six or seven images per bag may be inadequate.

For the foregoing reasons, clearly, using the CT scanner of the In Vision Machine one cannot scan the entire bag within the time allotted for a reasonably fast throughput. Generating only six or seven, or more, CT images per bag leaves most of the item un-scanned and therefore does not provide adequate or complete scanning. The solution to this problem proposed in the '764 and '552 Patents is to provide a pre-screening process. The pre-screening process in the prior art is accomplished by using a line scanner. The stationary line scanner is described as a common airport scanning system used by human operators in conjunction with hand-searches. By way of example, the prior art pre-scan station described in U.S. Pat. No. 4,031,545 (Stein) could function, in this instance, as the pre-scan station to identify object regions which are of a predetermined mass, determined by converting attenuation into mass values. Other exemplary prior art pre-scan systems include digital x-ray medical systems known to those skilled in the art.

The line scanner identifies up to six or seven, or more, suspect areas. The bag is then moved into the X-ray CT scanner where it is stopped for each scan of a suspected area, and then moved into position for the next scan. In this manner the system scans each baggage item relatively quickly since time consuming CT scans are only generated for suspect regions and not the entire baggage item.

The decision to reconstruct a selected region through CT is therefore limited to a single two-dimensional view assessment of the object. Because certain regions are clouded by other objects within the same two-dimensional image, the pre-scan station cannot always make an adequate determination as to the targeted object's mass, which in turn can trigger extra CT processing time to adequately assess those regions, or worse, fail to identify the area as suspect and allow the bag to continue through the scanner. This pre-scan uncertainty thus adds unwanted time and uncertainty to the security inspection process. It is clear that the accuracy of this system is therefore limited by the accuracy of the pre-screening process, and thus, if the pre-screening process has an 80% probability of finding a plastic explosive, then the system has, at best, an 80% probability of success.

Another problem with the In Vision Machine relates to the tradeoff between image resolution and speed of the machine. The thinner the slice of the scan and/or the smaller the width of each detector the better the resolution of the resulting image, but less volume of the bag is scanned. One suggestion in the '764 and '552 Patents is to take "approximately between 5 to 200 continuous CT scans", and generate data which is "displayed to an operator as a pseudo three dimensional image". See for example, col. 5, lines 54–56 of the '764 Patent. However, taking such a volumetric scan with a single detector array, dramatically increases the time required to scan each bag, severely decreasing the throughput of the system.

A further problem with this prior art pre-screen CT system is that it is complex and unwieldy. The In Vision Machine, as described in the '764 Patent, requires two separate electro-mechanical stations to implement the two-stage process: the first station houses the pre-screening line scanner equipment; and the second station houses the CT system. Accordingly, closed containers such as an item of baggage must traverse through the two separate stations before a full inspection is complete. The identification of targeted objects within the pre-scan station must be communicated to the second station in order to facilitate the reconstructive CT image in the suspect area identified by the line scanner. The position of the targeted area therefore must be timed and manipulated so as to ensure proper correlation of the location of the targeted area between the first and second stations. In other words, baggage identified in the pre-screening station must travel some distance, e.g., several feet, along a conveyor system while maintaining a physical registration to the suspect area within the desired accuracy of the measurement, e.g., three millimeters. In the '764 Patent, the spatial registration between the pre-screen station and the second, reconstructive CT station is facilitated by a connected combination of an input sensor 30, a conveyor 20, and a conveyor motion controller 22, such as described in column 4, lines 12. Accordingly, the benefits of pre-screening in the system described in the '794 Patent are offset, in part, by the increased complexity and control of the transport system, e.g., a conveyor belt, between the two stations, and the simultaneous control of two x-ray electro-mechanical mechanisms.

An improvement over the In Vision Machine is described in co-pending U.S. patent application Ser. No. 08/671,716, filed Jun. 27, 1996 (Attorney's Docket No. ANA-93) in the name of Bernard M. Gordon, entitled Quadrature Transverse CT Detection System, and assigned to the present assignee (hereinafter the "Gordon Scanner"), the application being incorporated herein by reference. The application (hereinafter the "Gordon Application") describes how throughput through a X-ray CT scanning system used to scan baggage can be dramatically increased, without the need for a pre-screening station, by using a two-dimensional, quadrature detection system so as to increase the depth of the cone beam through which baggage passes and simultaneously generate data useful for generating sinograms and CT images so as to reduce some of the data processing requirements. However, it may be desirable to further reduce the data processing requirements of the Gordon Scanner.

OBJECTS OF THE INVENTION

It is, accordingly, an object of the invention to provide a high speed scanning system which includes pre-screening for each item passing through the system, without the necessity of generating full CT reconstructive images, and which reduces or overcomes the problems associated with the prior art.

Another object of the present invention is to provide a X-ray CT scanning system for large volume, high speed scanning which includes pre-screening each scanned item, without the disadvantages of the In Vision Machine.

And another object of the invention is to provide a high-speed, large volume, explosive detection scanning system.

Yet another object of the invention is to provide methodology for generating selected CT reconstructed images based upon select projection data acquired during the CT scan.

Still another object of the invention is to provide a CT system which reduces the electro-mechanical complexity of prior art systems, such as the In Vision Machine, utilizing a separate pre-scan station and a CT scan station.

And yet another object of the invention is to provide a CT system which has increased pre-screening intelligence, as compared to the prior art, so that fewer reconstructive CT images are required for the same level of security protection.

And still another object of the invention is to provide methodology for reducing the overall time to assess the contents of closed objects such as baggage through CT scanning without reducing the accuracy of the security inspection.

And yet another object of the present invention is to provide a pre-screening technique for a CT scanner based upon user selectable projection data.

And still another object of the present invention is to provide pre-screening systems and techniques for other CT applications.

These and other objects will become apparent in the description which follows.

SUMMARY OF THE INVENTION

In accordance with one aspect of the present invention, a CT scanning system of the type for generating projection data of at least a portion of an object disposed within the system for each of a predetermined number N projections at corresponding N projection angles for each 360° scan of the object is modified to further comprise:

(a) pre-screening processor means for processing pre-screen data for each of a predetermined number of M projections at M projection angles, wherein $2 \leq M < N$; and (b) analyzer means for analyzing said processed pre-screened data to determine whether there is a likelihood of the presence of a physical attribute within the location of the object being scanned.

In accordance with another aspect of the invention, a CT scanning system is provided for scanning an object to determine the presence of a target that (i) may be disposed within the object and (ii) has a target signature associated with a measurable physical attribute. The system comprises:

(a) a source of X-rays;

(b) a detector system for receiving X-rays from said source during a scan so as to define a beam of X-rays between the source and the detector system;

(c) rotation means for rotating at least the source about a rotation axis so that said source moves through a predetermined number N of projection angles with each rotation of said source so as to provide an X-ray projection of an object disposed in said beam onto said detector system at each of said projection angles;

(d) data acquisition means, cooperative with said detector system, for acquiring projection data as a function of said physical attribute for each of said projections of an object disposed in said beam onto said detector system at each of said projection angles; and (e) processor means for processing said acquired data as a function of said physical attribute, said processor means including pre-screening means for processing pre-screened data which is that data acquired when said source is at a preselect number M of said N projection angles, wherein $2 \leq M < N$, to determine whether there is a likelihood of the presence of said target within the object being scanned.

Finally, in accordance with yet another aspect of the invention, a method is provided of determining the presence of a target within a containing volume of an object. The method comprises the steps of:

(A) positioning the object within a CT scanner and generating at least two projection views through at least a portion of the object;

(B) determining from the projection views whether there is a likelihood of the presence of said target within the portion of the object being scan; and (C) generating one or more full CT reconstructed image of the portion of the object being scanned when it is determined from the projection views that there is a likelihood of the presence of said target within the portion of the object being scan.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

A more complete understanding of the invention may be obtained by reference to the drawings, in which.

DETAILED DESCRIPTION OF THE DRAWINGS

Figure 1:
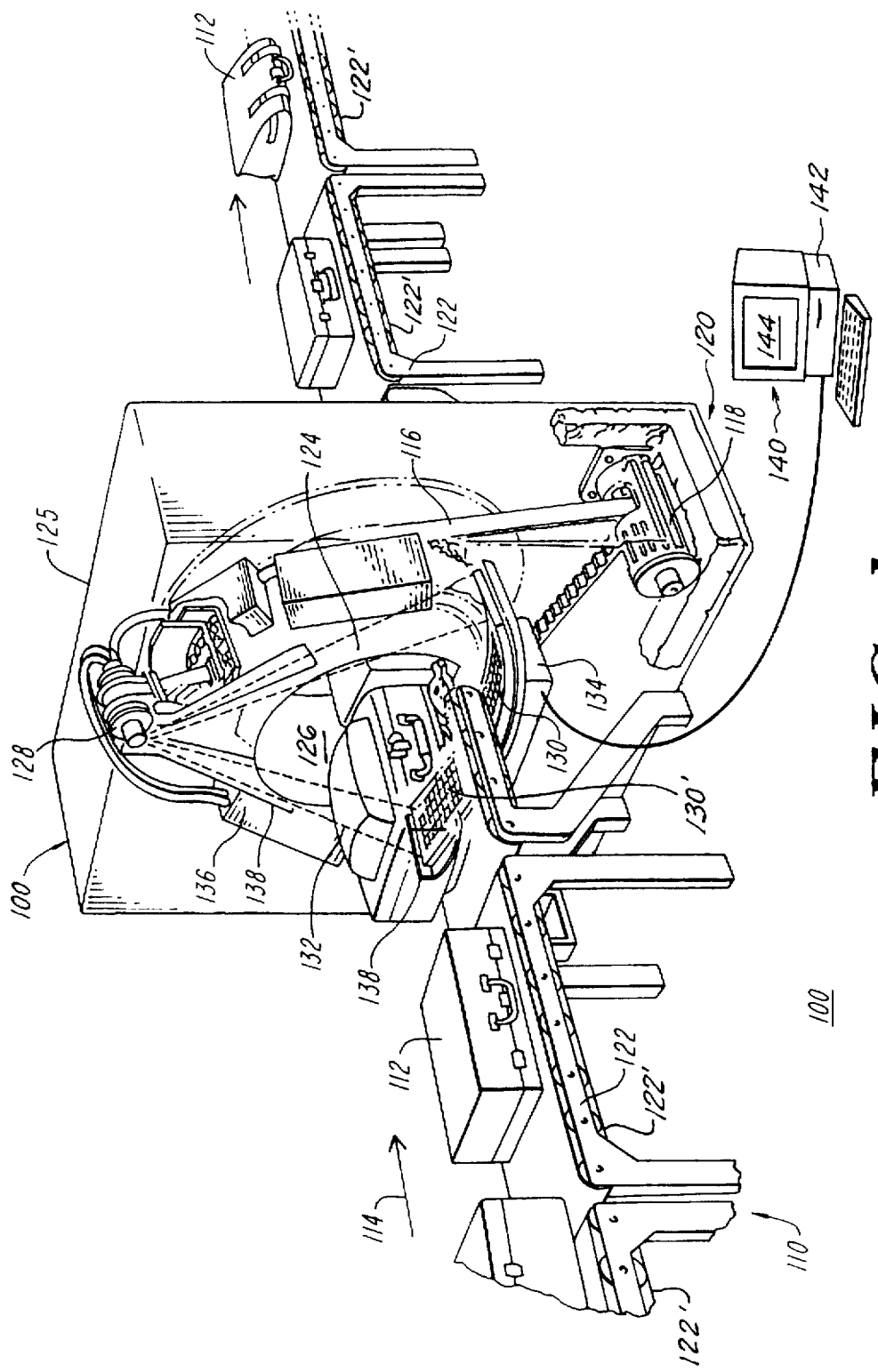
FIG. 1 shows a perspective view of a preferred embodiment of a high speed tomographic system, constructed according to the invention, and in operation with a baggage transport subsystem.
Figure 2:
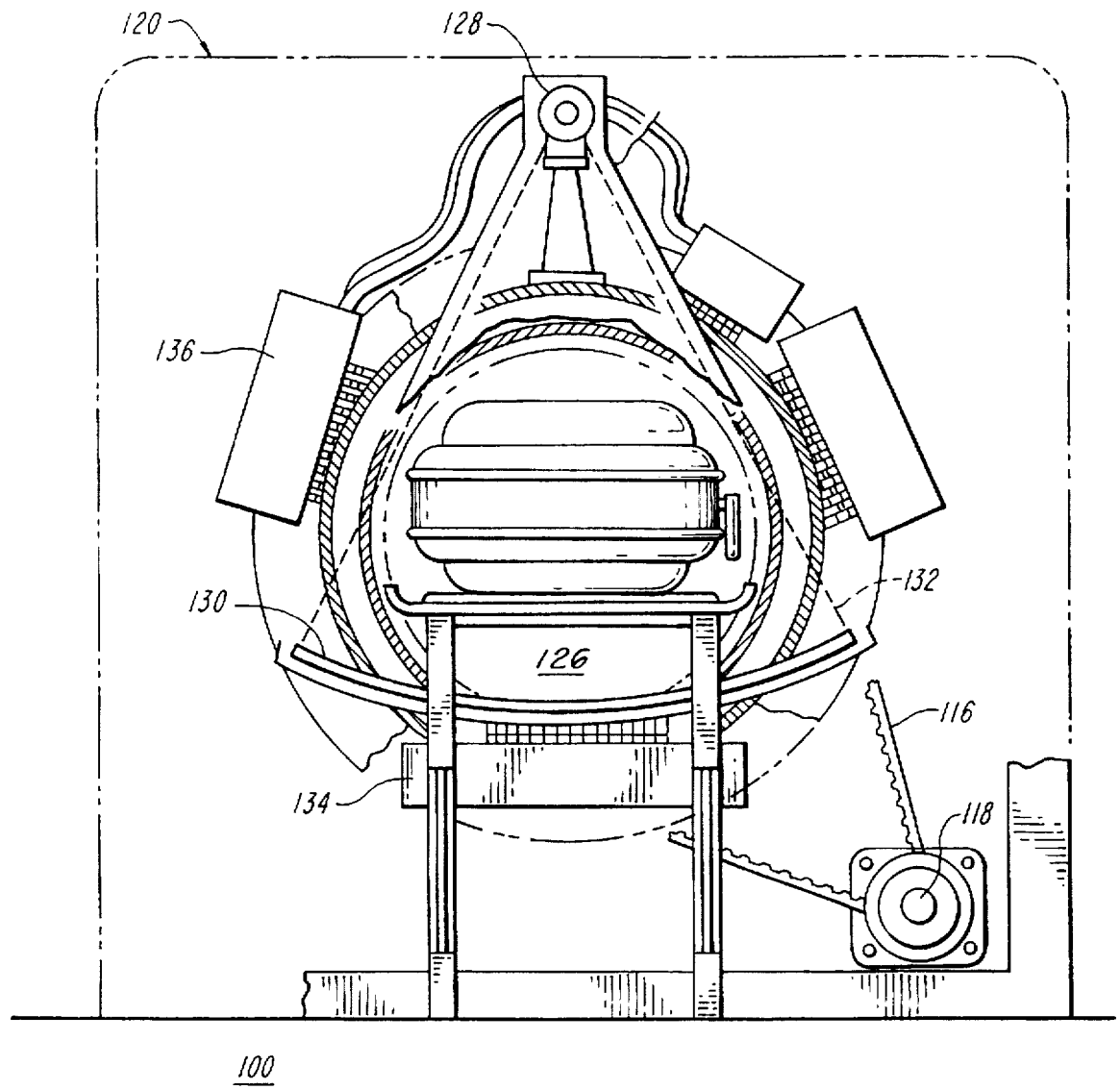
FIG. 2 shows an axial view, partially in cross section, of the system of FIG. 1.
Figure 3:
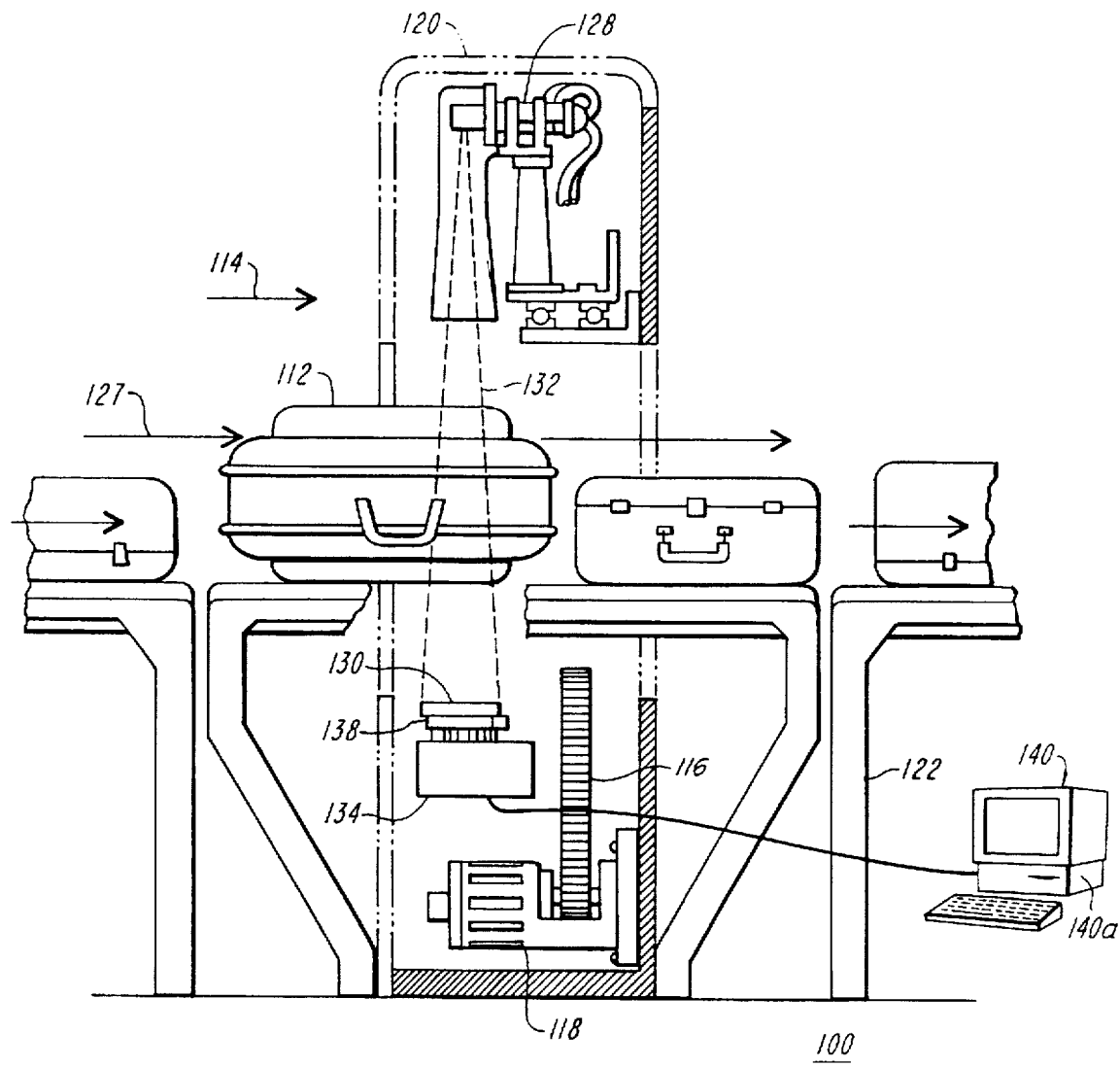
FIG. 3 shows a radial view, partially in cross section, of the system of FIG. 1.

FIGS. 1, 2, and 3 show perspective, end cross-sectional and radial cross-sectional views, respectively, of a preferred baggage scanning assembly 100 constructed according to the invention. Preferably, the assembly 100 is the same as the Gordon Scanner as described in the Gordon Application, except that it is modified in accordance with the present invention. Assembly 100 includes a conveyor system 110 for continuously conveying items of baggage, or luggage, 112 in a direction indicated by arrow 114 through a central aperture 126 of a CT scanning system 120. Conveyer system 110 is illustrated as including a plurality of individual conveyor sections 122, however, other forms of conveyor systems may of course be used. For purposes of illustration, conveyor subsystem 110 is shown to include a plurality of individual conveyor sections 122, each with motor driven belts 122' for supporting the items of baggage 112. However, those skilled in the art will appreciate that other forms of conveyor subsystems and/or conveyor belts may be used with the invention.

CT scanning system 120 includes an annular shaped rotating platform, or disk, 124 disposed within a gantry support 125 for rotation about a rotation axis 127 (shown in FIG. 3) that is preferably parallel to the direction of travel of the baggage 112, the latter being indicated by arrow 114. The platform 124 is driven about the rotation axis 127 by a suitable drive belt 116 and motor 118, or by any other suitable drive assembly, such as described in U.S. Pat. No. 5,473,657, which is incorporated herein by reference. Rotating platform 124 defines a central aperture 126 through which conveyor system 110 transports the baggage 112. System 120 includes an X-ray source 128 and a detector array 130 which are disposed on diametrically opposite sides of the platform 124. The detector array 130 is preferably a two dimensional array such as described in the Gordon Application when system 120 is used as a part of the baggage assembly 100, although those skilled in the art should appreciate that other detector arrangements can be used, such as a single row of detectors, depending upon the detection goals and intended use of the system 100. System 120 further includes a data acquisition system 134 for receiving and processing signals generated by detector array 130, and an X-ray tube control system 136 for supplying power to, and otherwise controlling the operation of, X-ray source 128. In certain applications such as a baggage scanner, the X-ray tube control system 136 can be, for example, a dual energy x-ray tube control system such as the one more fully described in co-pending U.S. patent application Ser. No. 08/671,202, filed Jun. 27, 1996 (Attorney's Docket No. ANA-94) in the names of Bernard M. Gordon, Hans Weedon, Iosif Izrailit, Timothy R. Fox and John F. Moore, entitled Improved Dual Energy Power Supply, assigned to the present assignee and incorporated herein by reference (hereinafter the "Gordon et al. Application"), since dual energy X-ray techniques for energy-selective reconstruction of X-ray CT images (see, for example, Alvarez, Robin et al., "Energy-selective Reconstructions in X-ray Computerized Tomography", *Phys. Med. Biol.* 1976, Vol. 21, No. 5,733–744 and U.S. Pat. No. 5,132,998 (Tsutsui)) are particularly useful in indicating a material's atomic number in addition to indicating the material's density, although it is not intended that the present invention be limited to this type control system. System 120 also includes shields 138, which may be fabricated from lead, for example, for preventing radiation from propagating beyond gantry support 125. The CT scanning system 120 is also preferably provided with a computerized system 140, described in greater detail hereinafter, for processing the output of the data acquisition system 134 and for generating the necessary signals for operating and controlling system 120. The computerized system 140 can also include a CPU 142 and monitor 144, and may also include a processing center (shown in FIG. 9 at 172 described hereinafter) for respectively processing and displaying information including generated images in accordance with the teachings of the present invention.

In operation, X-ray source 128 generates from its focal spot a pyramidically shaped beam, often referred to as a "cone" beam, 132 fo x-ray that pass through a three dimensional imaging field, through which an item of baggage 112 is transported by conveying system 110. The beam as well as the detector array subtends an angle in the X-Y plane about the focal spot sufficiently large so as to define a relatively large area through which the beam passes. For example, the angle can be of about 48°, although the angle can clearly vary. After passing through the scanned section of the item of baggage, cone beam 132 is received by detector array 130, which in turn generates signals representative of physical attributes of exposed portions of baggage 112 between the focal spot and the respective detector during the measuring interval. By way of example, one physical attribute can be the representative densities of portions of the items of baggage 112 as determined as a function of the integral of the attenuation of the radiation beam 132 passing through the container 112 and any object therein. Where a dual energy power supply is utilized, as taught for example in the Gordon et al. Application, the specific molecular weight of objects such as plastic explosives can be detected. Other physical attributes which may be detected will be evident to those skilled in the art. U.S. Pat. Nos. 5,490,218 and 4,884,289, for example, disclose useful background for inspecting concealed objects through the detection of photoelectric scattering, Compton scattering, diffraction and reflection, and are, accordingly, incorporated herein by reference. Thus, the baggage scanning system is not only useful for detecting plastic explosives, but as will be more clearly understood hereafter, the system can be used to detect other targeted objects, such as firearms and the like.

Disk 124 rotates about its rotation axis 127, thereby rotating X-ray source 128 and detector array 130 in circular trajectories about baggage 112 as the items of baggage are sequentially transported through central aperture 126 by conveyor system 110 so as to generate a plurality of projections at a corresponding plurality of projection angles with each 360° rotation of the gantry. In a well known manner, signals from the detector array 130 can be initially acquired by data acquisition system 134, and subsequently processed by a computerized system 140.

In accordance with at least one aspect of the present invention, the CT system 120 is modified to utilize preselected, pre-screen data preferably acquired by the data acquisition system 134 during each rotation of gantry disk 124. Preferably, the preselected, pre-screen data is representative of individual projections at two or more preselected projection angles about the rotation axis 127. For example, during each 360° rotation of the gantry disk, data for 1440 projections, one for every 0.25 degrees rotation, might be acquired, with data from three of those projections, spaced 120 degrees apart being used to pre-screen. The preselected, pre-screen data preferably is analyzed prior to utilizing all of the scanned data to provide a reconstructed CT image, as described in greater detail hereinafter. The pre-screen data can be received from the data acquisition system 134 by computerized system 140 so that the pre-screen data can be analyzed to determine whether the physical attribute of interest is present in the item of baggage 112 under inspection. Preferably, the pre-screen data is analyzed to determine whether there is a likelihood of the presence of the physical attribute. The determination of whether there is a likelihood of the presence of the physical attribute, may be defined, for example, as a predetermined minimum probability, or a minimum (threshold) level of a measured value, or a value calculated from measured data acquired from the scan which is correlated to the physical attribute. If such data is present, then all of the data acquired by the system 140 from that particular scan can be used to generate a full reconstructed CT image.

Thus, in accordance with the present invention a limited number of the projections are used in the pre-screening process to assess possible target objects, e.g., plastic explosives, within each item of baggage 112 passing through the system. The pre-screening process preferably uses more than one projection view for each revolution of the gantry disk so as to provide select views of the baggage as it moves through the rotating disk of the scanner system, but less than the total number of projections taken for generating a full CT reconstructed image. Once a suspect area is detected, a greater number of the projections are used to generate a full CT reconstructed image.

In accordance with another aspect of the invention, with the conveyor system capable of continuously, or at least sequentially, moving baggage 112 through the CT scanning system 120, the entire item of baggage 112 can be scanned, and all of the data collected and stored in computerized system 140. The data from a predetermined number of projections at selected angles then can be used to generate two or more two-dimensional images of the baggage from different projection views. For example, where data is used for projections spaced 120 degrees apart to perform the pre-screening function, three two-dimensional images can be generated from data acquired by utilizing all of the data acquired from the respective angular positions chosen for the pre-screening function. If one projection position is at the twelve 0'clock position above the baggage, all of the data acquired at the twelve 0'clock position as the bag 112 moves through the scanner can be used to provide one image, all the data acquired at the four o'clock position as the bag 112 moves through the scanner can provide a second image, and all of the data acquired at the eight O'clock position as the bag moves through the scanner can provide a third image. In the event that a portion of or all of a bag is suspect, full data collected with the select data can be used to reconstruct the appropriate slice, or full helical or volumetric image or images in accordance with techniques well known in the art. In this manner, the various projection views created by the pre-screening process are made from predetermined angles of the projections used in the pre-screening process, without the need for additional hardware, and without the requirement of registering pre-screening equipment and the CT scanning equipment such as required by the prior art.

In the preferred embodiment data acquisition system 134 therefore receives information associated with full CT scans, utilizes select data acquired at preselected projection angles during rotation of the gantry disk 124, and generates therefrom, in cooperation with computerized system 140, information relating to two-dimensional projection images that can be used for both pre-screen detection and, with other acquired data, full-image CT reconstruction. In the pre-screen mode, a smaller number of projections, e.g., two to ten projections, are used by the data acquisition subsystem 134 and computerized system 140 to determine the existence of any physical attribute or target within the current scan geometry, i.e., within the scanned volume of interest. If there is a likelihood that a target is detected in the pre-screen mode, many or all of the projections already gathered within that scan geometry are fully processed to reconstruct the image of the scanned volume or parts thereof using CT techniques. The pre-screen data is thus used to determine the likelihood of the presence of select targets, such as plastic explosives and/or firearms; while the reconstructed CT images are used to verify and more fully investigate those regions detected as possibly containing targeted objects.

Thus, by using the preselected data acquired at select angles during a full CT scan, one can (a) use data acquired during the CT scan and therefore eliminate the need for a separate pre-screening subsystem, such as a line scanner, (b) increase the chance of detection because two or more views are used for pre-screening the object, (c) eliminate the need to and complexity of coordinating the two inspection stations as suggested by the In Vision Machine, (d) still reduce the amount of computations required for a full CT scan of the objects being scanned while maintaining the required throughput without sacrificing reliability, and (e) easily modify the number of projections used for the pre-screening process, by reconfiguring computerized system 140.

Once the scanning process is complete, bags suspected of containing a targeted object, e.g., a sheet of explosives, can be removed automatically from the conveyor subsystem 110, and, if desired, automatically transported to another location for physical examination by a security specialist. Alternatively, an alarm can be activated to warn the appropriate officials that one or both of the pre-screen and full-image CT scans identified a targeted object, which can also be displayed on a monitor such as monitor 144.

Figure 4:
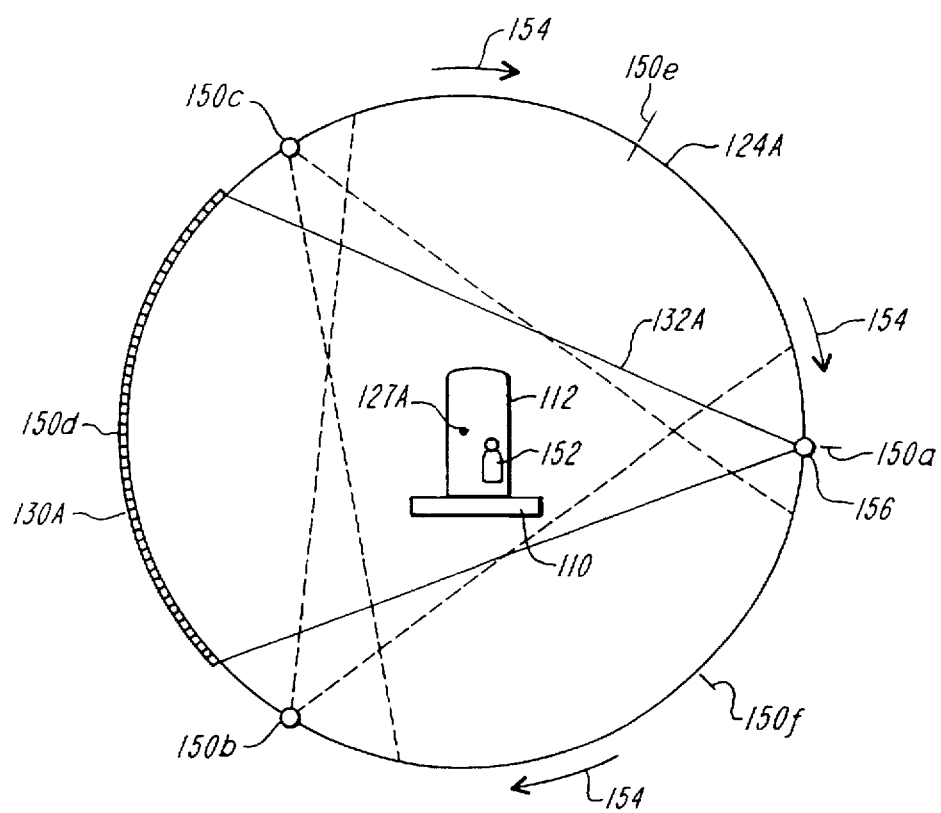
FIG. 4 illustrates an operational view, in accord with the invention, of a plurality of representative projections through a scanned volume acquired from a single rotation of the gantry disk of another preferred embodiment of the present invention.
Figure 5:
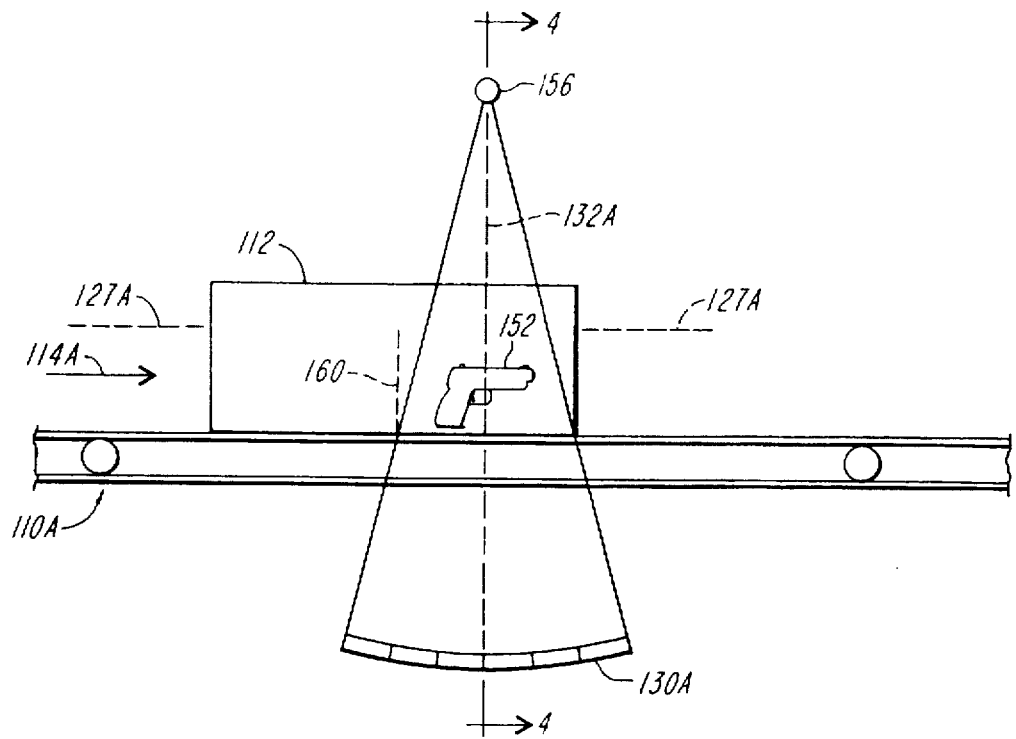
FIG. 5 illustrates an operational side view, perpendicular to the view of FIG. 4, which includes a representative projection taken from above and normal to the direction of movement of the container under investigation.
Figure 6:
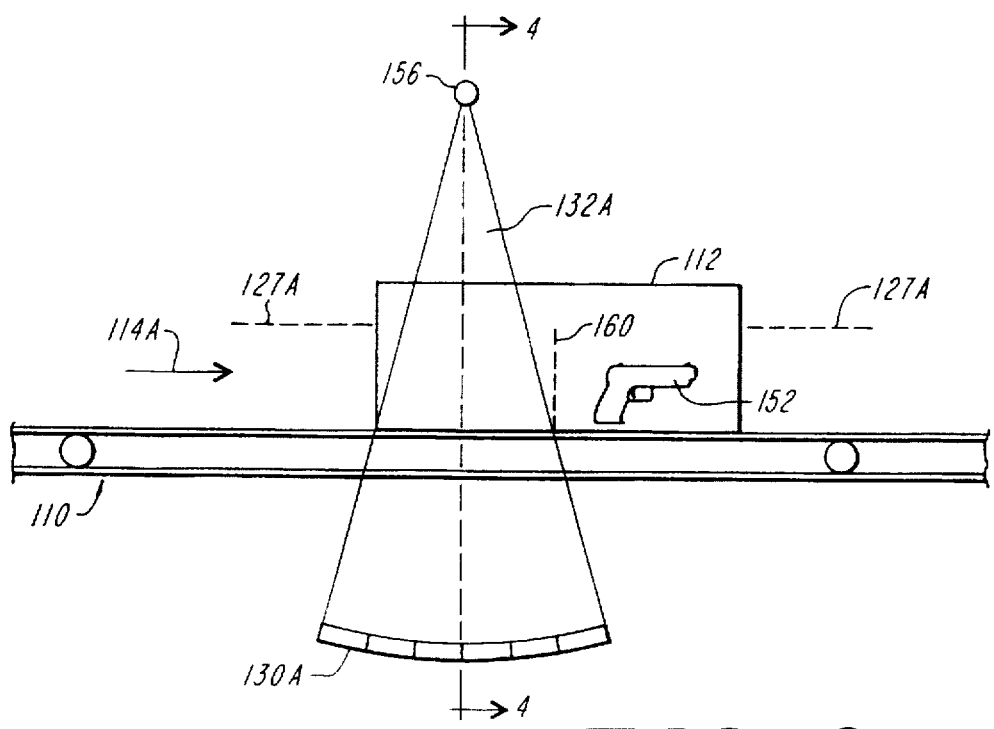
FIG. 6 illustrates an operational side view, similar to the view of FIG. 5, which includes the representative projection taken from above and normal to the direction of movement of the item under investigation and which as shown occurs at a later time than the projection of FIG. 5.

The foregoing and other aspects of the present invention will be more evident from the remaining Figures which illustrate examples of the principles of the present invention. In FIGS. 4–6 the scanner system 120A is shown in simplified or schematic form for clarity of illustration. FIG. 4 illustrates the rotational movement (illustrated by arrows 154) of a focal spot 156 of a X-ray source and detector array 130A about rotation axis 127A around the item of baggage 112 and a target 152 disposed within the contained volume of the item of baggage, as the baggage is transported by the conveyor subsystem 110 through the system. As the baggage 112 moves on the conveyor system 110, and the focal spot 156 and detector array 130 rotate around the bag, data is acquired at each of many projection angles with each revolution of the platform 124. For example, the scan may include 1440 projections, one for each 0.25 degree rotation of the focal spot and detector array. Of the total number of projections for each revolution, the data from only a select number of projections for each revolution is used to pre-screen. By way of example, the data from three projections, indicated at positions 150a, 150b and 150c, are used in the pre-screening process. Positions 150a, 150b and 150c preferably are equally angularly spaced from one another about the rotation axis 127 so as to be 120 degrees apart since data will be acquired during measuring intervals taken between substantially the same time intervals it takes the platform to rotate between successive positions of these selected projections. Thus, for example, position 150a is shown at the three o'clock (90°) position, position 150b is shown at the seven o'clock (210°) position and position 150c is shown at the eleven o'clock (330°) position. As previously mentioned, the number of projections for each scan revolution at which the acquired data is used during the pre-screening process can vary. The number chosen is a tradeoff. Increasing the number of projections included in the pre-screening process will increase the probability of detecting a suspected object, but will also increase the amount of computational time for the pre-screening process. Further, the projection angles chosen for the pre-screening process can depend on certain design considerations. Where it is desirable to maximize the differences in pre-screening data for analysis purposes while minimizing what might be considered duplicative data, no two projections used in the pre-screening process should be displaced by 180 degrees. On the other hand, using projections 180 degrees apart will contain similar data, although not necessarily identical data. Thus, in the first instance, with three projections spaced 120 degrees apart as shown in FIG. 4 used in the pre-screening process, the maximization of differentiating the different views is achieved, i.e., the view from positions 150a, 150b and 150c are all different. In the second instant, in addition to the positions 150a, 150b and 150c, data is also acquired at position 150d (at the 270° position), position 150e (at the 30° position) and position 150f (at the 150° position), which are respectively 180 degrees displaced from the positions 150a, 150b and 150c so as to provide data for six different projection views with some duplication of data. For example, the data collected at the 90° position 150a would be a similar view as the one taken at the 270° position 150d. Note, however, that in addition to having data which is similar, but not identical, the baggage moves in the direction of arrow 114 during the time it takes for the focal spot 156 to move between position 150a and 150d. However, the shift of the baggage in the direction of arrow 114 will be only half the distance of the shift that occurs between successive measurements at the same position 150a or 150d.

FIGS. 5 and 6 illustrate an example of the movement of baggage in the direction of arrow 114 between the beginning and end of a 360° rotation of the gantry disk 124A to acquire projection data of the baggage 112 and target 152 at the same projection angle at the corresponding measuring intervals. FIG. 5 illustrates a projection taken at the angular position at 0° above the bag as it passes through the CT scanner system at a first time, while FIG. 6 illustrates a projection taken at the same angle at a second time, after the platform 124A has made one revolution about axis 127A. The amount of volume scanned with each revolution of the gantry platform 124A is determined by the speed at which the bags are transported through the beam 132A by conveyor system 110A. Each successive rotation of the gantry is preferably fast enough to ensure that no region of the bag 112 remains unsampled by the CT scanning system 120. By way of example, the mark 160 on bag 112 illustrates that the bag 112 was sampled sufficiently, between the two successive projections at the select projection angle so as to ensure that no region of the bag 112 passes without inspection. In fact, it may be desirable to have a slight overlap of scanned volume to insure that the entire volume is scanned.

Figure 7:
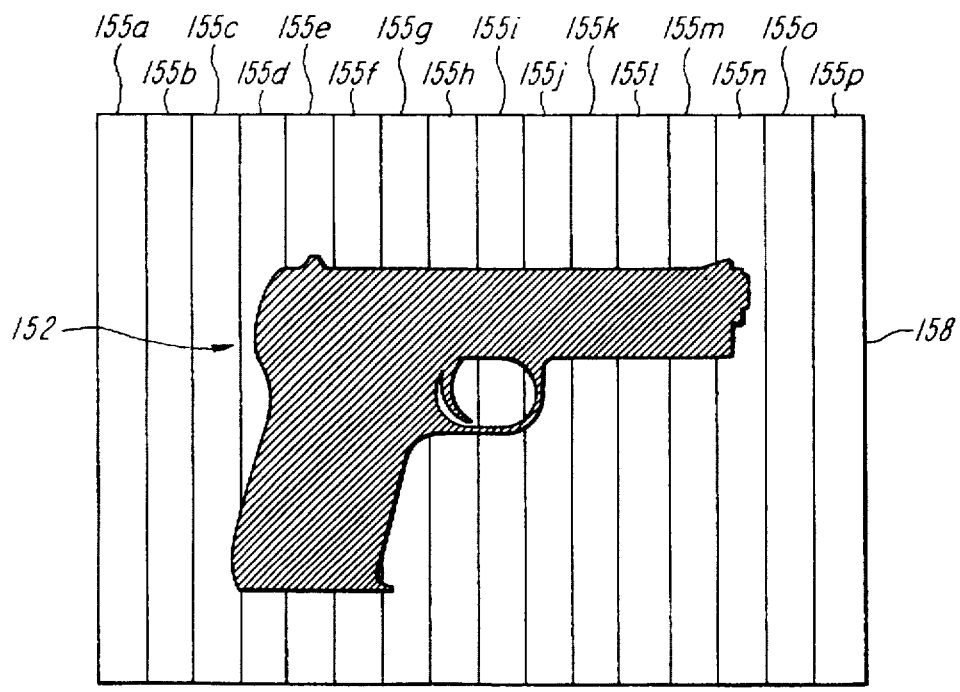
FIG. 7 illustrates an image reconstructed from data acquired from one or more projections and used in detecting a targeted object, such as a firearm, and which is formed through one or more rotations of the gantry disk, in accord with the invention.

The invention as shown in FIGS. 4–6 demonstrates an important advantage over the prior art. Specifically, the target 152, here shown as a firearm, has a limited cross-sectional area when viewed from the position illustrated in FIG. 4, where only the gun barrel and handle are discernible. This is the direction of view of each CT reconstructive image which can be created by CT scanning system 120. Along the direction of rays of the projection 150a of FIG. 4, at the 90° position 150a of the focal spot 156, however, the data acquired from the detectors 130A at position 150a from one or more successive rotations of the gantry disk as the item of baggage 112 is moved through the scanner will result in the outline of firearm 152, being easily recognizable from this projection angle as seen in FIG. 7. Accordingly, because the pre-screening process involves using data from two or more projections at respective positions about the rotational axis 127 with each rotation of the platform, there is a much greater likelihood of detecting the target 152 during the pre-screening process as compared to a single direction, pre-screened, two dimensional image provided by the line scanner of the In Vision Machine.

While data acquired at the same projection angle for one or more consecutive rotations of the platform disk can be analyzed for the physical attribute associated with a firearm, e.g., density, it should be apparent to those skilled in the art that the acquisition of data from the projection taken at position 150 used in the pre-screening process for one or more successive rotations of the gantry platform also can be used to make a composite picture of a two-dimensional image 158 as seen in FIG. 7. For example, each image section 155 is created from the data acquired at the projection angle at position 150a (as seen in FIG. 4) for one rotation. The image 158 shown in FIG. 7 by way of example has sixteen sections, created from data acquired at the projection angle 150a from sixteen consecutive rotations of the gantry. Alternatively, where a two dimensional detector array is used as array 130A (as seen in FIG. 4) as taught in the Gordon Application, the composite image shown can be formed from data acquired from the rows of detectors as a result of fewer rotations of the gantry disk with the data acquired from each row being used to create image segment 155. Thus, a sixteen row detector array can be used to create the image 158 with a single revolution of the gantry platform. The number of individual image segments 155 used to form the composite image 158 can vary and is not necessarily a function of only the number of rotations of the platform that are necessary before enough data is acquired to make the composite image, or a function of only the number of rows of detectors constituting the array 130, but can be, for example, a function of both. For example, eight rows of detectors, can be rotated twice through position 150a so as to generate sufficient data to create a 150c composite image 158 of sixteen image segments 155. In any such scenario, the size of image 158 should be chosen to provide the best probable result. For example, a projection which corresponds only to image segments 155a–155d gives little practical insight as to what the object indicated at 152 is since only a portion of the handle 152a is visible. On the other hand, if the full image 158 is displayed on a monitor 144, the outline of firearm 152 within image 158 is easily discernible by a security official. Similarly, if the image data is processed by known image correlation techniques to detect targeted objects such as the firearm 152, without necessarily displaying the image, these techniques are more likely to detect the firearm 152 as shown in image 158 than in a image which consists of image segments 155m–155p, for example. It is noted that by selecting more than one projection angle for the pre-screening process, composite image data can be acquired for each projection angle chosen, and each set of data can be analyzed in a similar manner and/or displayed on monitor 144, for example.

Figure 8:
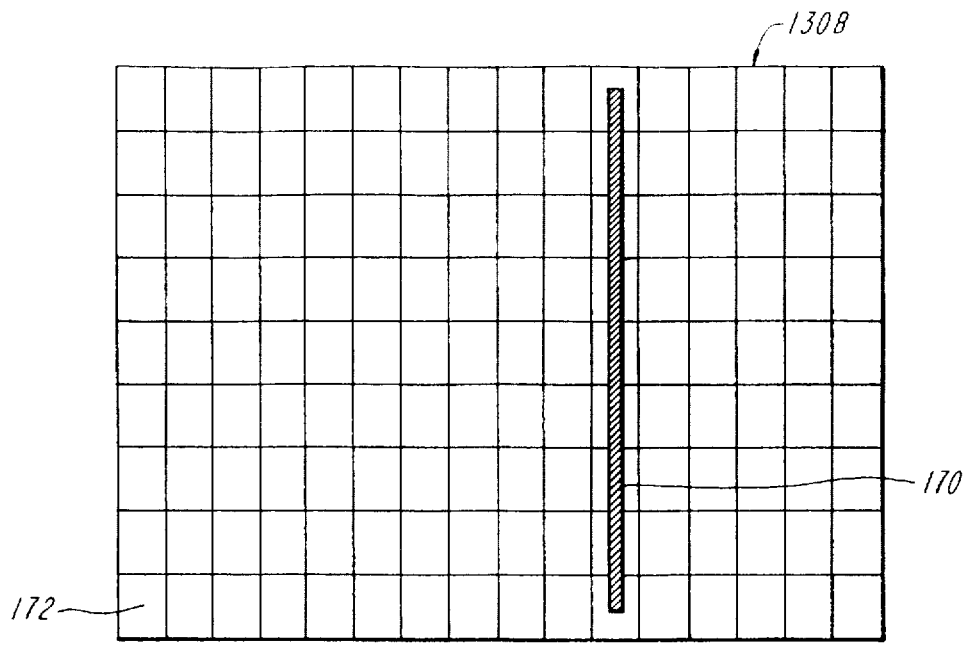
FIGS. 8 illustrates a shadow of a sheet of explosive relative to a projection parallel to the plane of the sheet.

Although the above figures illustrate uses of the invention relative to firearm detection, it should also be apparent to those skilled in the art that the invention can be used in the detection of other targets, including those having target signatures (relating to one or more physical attributes) which can be specifically distinguished from other items where specific detection techniques are employed for recognizing those target signatures. Such targets, for example, include plastic explosives. However, in the detection of plastic explosives, the shape and/or outline of the targeted object is less important because plastic explosives are best detected by measurements that are made, for example, with dual energy detection schemes known to those skilled in the art. Therefore, any detector or plurality of detectors within the rotating gantry can be used to detect the plastic explosive. Further, note that the data acquired by the pre-screening process need not be imaged, but simply analyzed in computerized system 140, as described in the Gordon Application, for example. If a targeted object is suspected from an analysis of the pre-screen data, a reconstructed volumetric CT image can be created and displayed, for example, on monitor 144. More specifically, as shown in FIG. 8, and as described more fully in the Gordon Application, a sheet of plastic explosive 170 placed in an item of baggage 112 and oriented so that its thinnest dimension is thin enough so as to be shadowed onto a single row of detectors 172 of the detector array 130B (shown, for example, as a two-dimensional array, although a single array can also be used) at one of the projection angles chosen for the pre-screening process. A similar shadowing may occur at the other projection angles selected for the projection angles selected for the pre-screening process although the shadow will move along detector array as the scanned object moves through the machine. Using dual energy techniques, such as described in the Gordon et al. Application, it is possible to provide an indication that there is a likelihood of the presence of plastic explosives, and a further investigation should be made. This can be accomplished by generating a full CT image from the data collected at the same time as the data was collected for the projection angles used in the pre-screening process. It should be appreciated that while the sheet may appear of very small mass at one projection angle and therefore be undetectable at that angle, by using data from at least two projection angles, the probability of detecting the sheet of explosive during the pre-screening process is improved.

Figure 9:
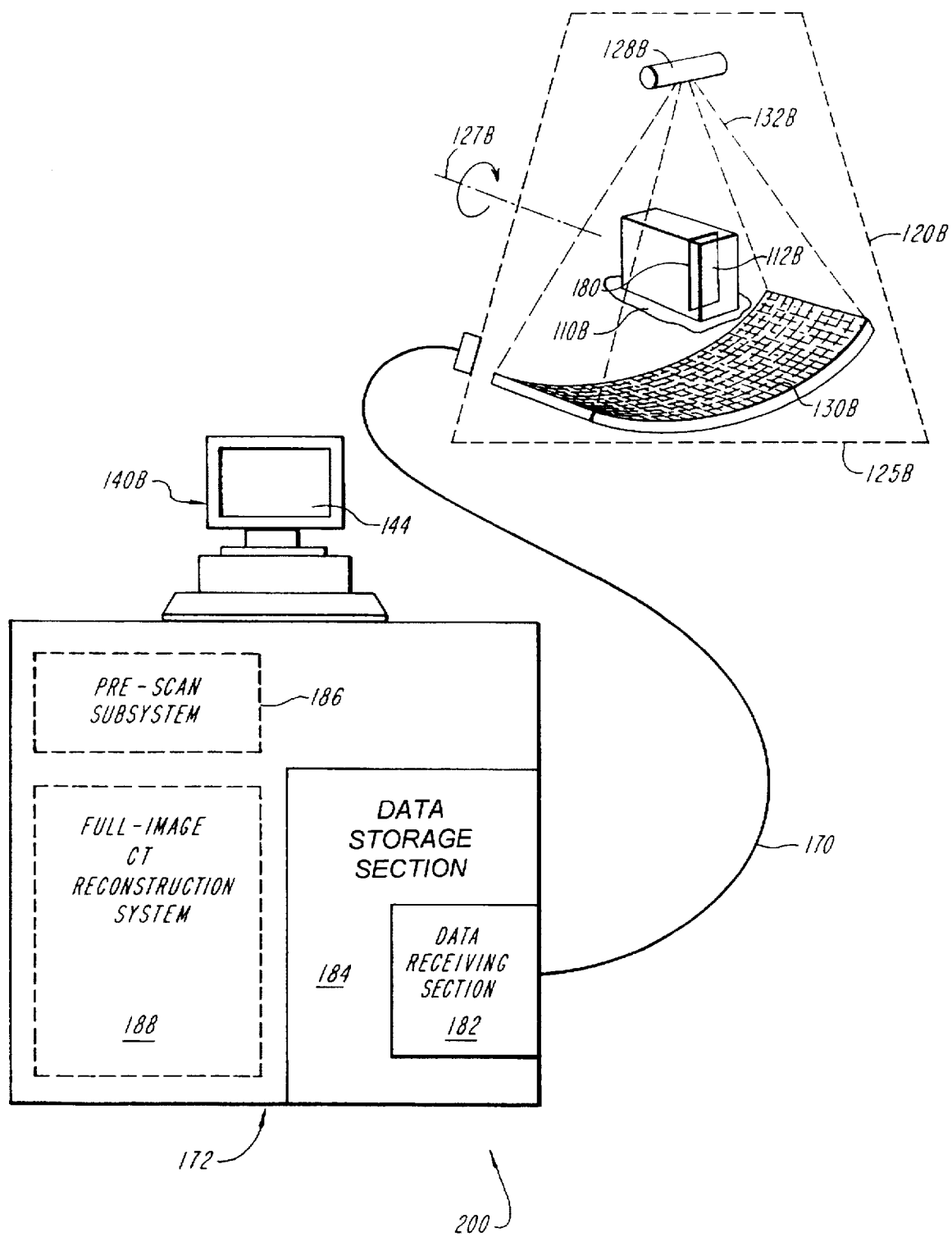
FIG. 9 illustrates another preferred embodiment of the system constructed according to the invention which provides for pre-screen detection and selective full-image reconstruction of target objects, such as plastic explosives.

For example, referring to FIG. 9, if the baggage 112C is to be pre-screened using dual energy techniques, in at least five directions normal to the rotation axis 127, there is a greater probability of detecting plastic explosive. For example, if five views used in the pre-screening process are equal-angularly spaced apart 72° from one another, one from above the conveyor system at the 0° position (directly above the bag) and the second, third, fourth and fifth positions being at the 72°, 144°, 216° and 288° positions respectively, there is a greater likelihood of detecting plastic explosive than if only one view were used. If the item of baggage 112 contains a thin sheet of plastic explosive (dimensioned, for example 2.0 mm thick, 6 cm wide and 30 cm high) sewn within the lining of the bag, and oriented so that the 30 cm dimension is the height dimension and the sheet will be substantially parallel to the X-Y plane of rotation of the X-ray beam and detectors as the platform rotates about the axis 127 (and shadowed on the detector array in a manner similar to that shown in FIG. 8), it can be seen that if only the side 90° view were relied upon for pre-screening, the shadow of the sheet (seen in the example as a rectangle 2.0 mm by 30 cm) would extend over many of the detectors when the projection is taken. If the sheet 180 is sufficiently thin compared to the resolution of the system, it can be understood that the sheet might go undetected, because the corresponding density measurements may not indicate the presence of a plastic explosive. However, in the 0° direction, the sheet shadows a fewer number of detectors (since in the example the same mass will be seen as a rectangle 2.0 mm by 6 cm and therefore the X-rays will pass through five times as much mass as in the 0° view than in the 90° view), increasing its changes of detection, particularly where a dual energy power supply is used to supply power to the X-ray source, during the pre-screening process.

Figure 10:
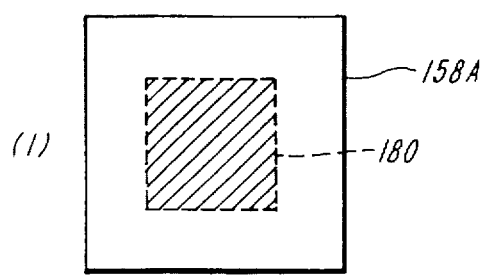
FIG. 10 shows a typical image generated from data acquired from a first plurality of projections used, illustratively, in a pre-screen mode to detect a target object, in accord with the invention.
Figure 10:
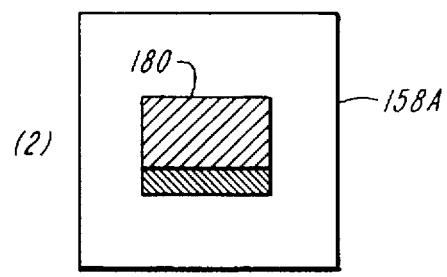
Figure 10:
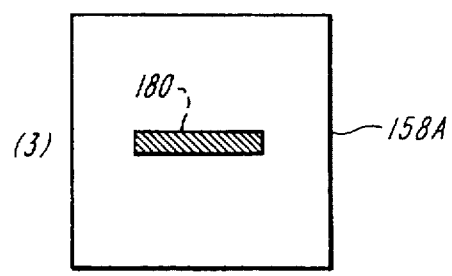

FIGS. 9 and 10 illustrate these principles as well as illustrate other aspects of the invention. As shown, the portion of an embodiment of the CT scanning system 120B for acquiring and evaluating data as each item of baggage 112 passes through the system on the conveyor system 110. In operation, X-ray photons emitted from the X-ray source, passing through the item of baggage 112 and detected by each detector of the detector array 130 during each measuring interval (corresponding to each projection as the gantry disk rotates about the rotation axis 127), are converted to electrical data signals and processed in a well known manner by the data acquisition system 134, the latter being preferably positioned on the platform 124. The data signals processed by the data acquisition system 134 are communicated to the computerized system 140 through a suitable data transmission system including, for example, slip-rings or the data transferring system described in U.S. patent application Ser. No. 08/174664, filed on Dec. 28, 1993, entitled Apparatus for Transferring Data to and from a Moving Device, filed in the names of Bernard M. Gordon, Richard B. Johnson, Iosef Izrailit, Hans Weedon and Douglas Abraham (Attorney's Docket No. ANA-29), over communication line 170 to the computerized system 140A. In this embodiment in addition to the CPU 142 and monitor 144, the computerized system 140A includes a data processing center 172.

Processing center 172 includes a data receiving connection 182 attached to communication line 170 so as to receive the data from the CT scanning system 120, data storage section 184 for storing data received through the data receiving connection 182, a pre-screen subsystem 186 for processing the pre-screened data, and a full-image CT reconstruction subsystem 188 for processing the CT reconstructive image data. The data receiving connection 182, e.g., a data port, facilitates communication by and between the CT scanning system 120 and the processing center 172.

The data storage section 184 communicates with the data port forming the connection 182, and provides temporary storage for all of the data acquired from a predetermined number of projections. Preferably, the memory within storage 208 is sufficient to accommodate all projection information acquired within the current scan, i.e., the last full rotation of the gantry platform 124, as well as projection information acquired within a selectable number of previous rotations, and in particular capable of storing all of the data acquired from at least an entire item of baggage. In this manner, pre-screen data and full-image CT reconstruction can occur, selectively, for any one part of an object that is or has just passed through the central aperture 126 of the gantry platform 124.

Subsystems 186 and 188 also communicate with the data port at 182 and/or storage section 184 so as to acquire and manipulate projection data selectively. For example, a user of the computerized system 140 can command the pre-screen subsystem 186 to utilize five projections of the current scan, each spaced equidistantly from each other, to provide for pre-screening and object detection.

Selective pre-screening is illustrated in FIG. 10, where three composite images (1) through (3) are shown which represent three projection views (1) through (3) of an item of baggage taken through a predetermined number of rotations of the gantry disk (or data from multiple rows of detectors, or both) during the pre-screening process. In this example, a sheet of explosive is oriented so as to be parallel to the rotation axis 127B (see in FIG. 9) and oriented parallel to the plane of the support surface of the conveyor system. Images (1) through (3) might represent the projections taken at the 0° (directly above the bag), and 45° and 90° positions. In the example given, the dual energy X-ray beams pass through a large area of mass in view (1). The corresponding area of the density measurements of the sheet of explosives image 180 in the views (2) and (3) are thus relatively smaller than those shown in view (1), since the dimensions of the shadow of the sheet image 180 in each of these directions of views (2) and (3) is smaller than the dimension of the shadow taken at projection (1). Thus, viewing the three images, the visual detection of the sheet is more likely in view (1) than in view (2), while detection in view (2) is more likely than in view (3).

Thus, while the detection of the sheet of explosives in view (2) and (3) is less likely than in view (1), by providing all three projections (1) and (3), in combination, a greater amount of imagery and/or density information is provided increasing the probability of detecting explosives or other objects of concern passing through the CT scanning system 120. In this instance where the presence of an object of concern is believed present as a result of the viewing and/or analysis of the pre-screened data, i.e., there is a likelihood of its presence, pre-screen subsystem 186 communicates the appropriate instructions to the full-image CT reconstruction subsystem 188, which in turn generates one or more full CT reconstructed images. The full images may be combined to provide single slice images, or a three-dimensional image of a predetermined volume of concern.

Alternatively, the pre-screen views (1) through (3) can be displayed on the monitor 144 which is controllable by a user such as a security specialist. In this case, such a user can review the pre-screen images and, in effect, zoom in to enhance clarity in those instances where the object under review is not clear in any of the projections. In most cases, however, the likelihood criterion of the pre-screen subsystem is automatically communicated to the full-image CT reconstruction section 188 when a suspect object of concern is suspected of being present as a result of the pre-screening process so that all baggage is evaluated in a time-convenient manner.

Those skilled in the art should appreciate that changes can be made within the description above without departing from the scope of the invention. For example, it is known that CT data facilitating full-image reconstruction can be acquired through a rotating gantry platform upon which the X-ray source is mounted thereon, but the detectors are mounted on the gantry support. In so-called fourth generation CT scanning machines, an array of static detectors are circumferentially, equiangularly spaced around the rotation axis 127.

Those skilled in the art should also appreciate that other uses of the invention can be made in the detection of targeted objects in a quick and efficient manner. For example, the system can be used to scan other closed containers such as mail. Further applications include those in the medical industry. For example, patients with suspected metastasized tumors can be evaluated by a system constructed in accordance with the invention without the time-consuming process of reconstructing full body CT images. Instead, after preparing the patient (for example, injecting the person with an appropriate marker dye), the person under scan is evaluated by reviewing and/or processing the pre-scan projections, and by evaluating the pre-scan data to determine whether a full CT image in one or more locations is required to more fully investigate a detected target that might represent a tumor. In this way two or more different projection views can be generated from a scan of the area of the body of concern as a part of a pre-screening process.

In some instances, it is preferable to scan objects only with the pre-screen projections without the simultaneous acquisition of full CT reconstructive data, but analyzing the pre-screened information before performing select full CT scans. Such a sequential process can be easily accomplished in accordance with the teachings of the present invention. For example, in medicine it is preferable not to expose a patient to excessive x-ray radiation. Therefore, in accord with the invention, a pre-screen detection process can be undertaken by acquiring a plurality of projection views about the patient and assessing this limited subset of data prior to scanning the patient for the larger numbers of projections required for full-image CT reconstruction. Using this approach, for example, the X-ray source can be pulsed at each position where a pre-screen projection view is desired, or alternatively, in between each pre-screen projection, the source is shuttered, e.g., with a lead shutter, so as to block harmful radiation between successive exposures required for the pre-screening process. In the event that a target object such as a metastasized tumor is suspected, the operator can be appropriately informed, for example on the monitor 144 as to the location of each suspected area, and one or more full-image CT reconstruction of each of the suspected metastasized areas can be commanded by the operator in those areas.

Figure 11:
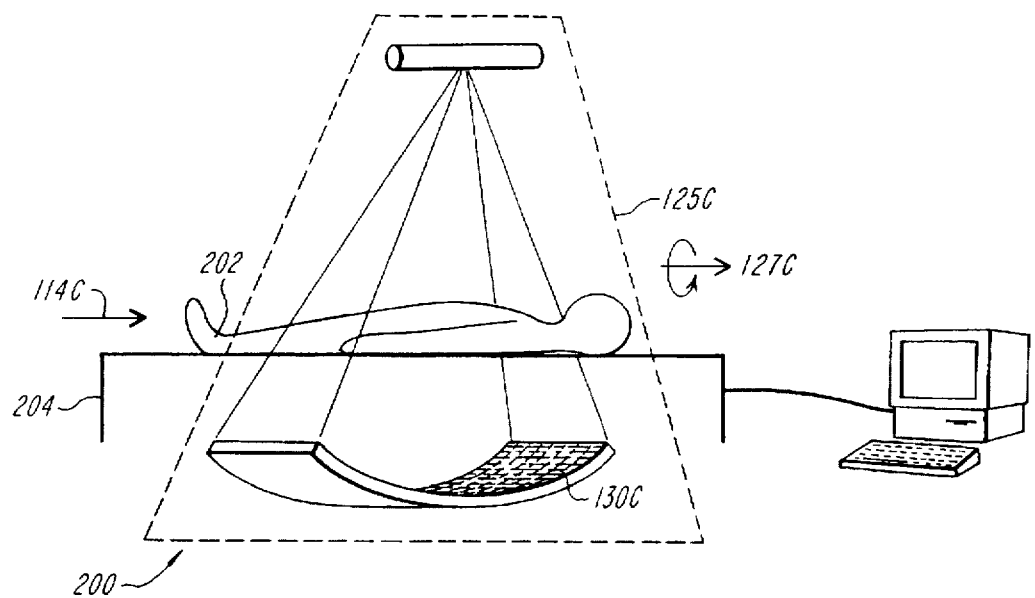
FIG. 11 illustrates a preferred embodiment of a medical pre-screen system constructed according to the invention for reducing patient exposure to unwanted radiation.

FIG. 11 illustrates a medical CT system 200 for detecting undesirable patient targets, e.g., tumors, with decreased exposure to harmful radiation. The system is similar to the system 124, previously described, although the detector array 130C shown as a two dimensional array may be formed with a single row of detectors. In this case the patient 202 is mounted on a suitable support, such as a table or pallet 204, and the table 204 and gantry support 125C are movable relative to one another in the linear direction indicated by arrow 114C. In many commercial machines the gantry support 125A remains stationary while the table is moved through the aperture 126A, although the movement of the gantry support 125A relative to a stationary table 204 has been described in U.S. Reissue 30 Pat. No. RE 34,379, entitled X-Ray Tomography Apparatus, and issued Sep. 14, 1993 in the name of Bernard M. Gordon (Attorney's Docket No. ANA/DG-1Re), and described in U.S. Pat. No. 5,499, 415, entitled Stabilized Cantilevered, Patient Trauma Table System, and issued Mar. 19, 1996 in the name of Gil W. McKenna, (ANA-58), both patents being assigned to the present assignee and incorporated herein by reference.

Figure 12:
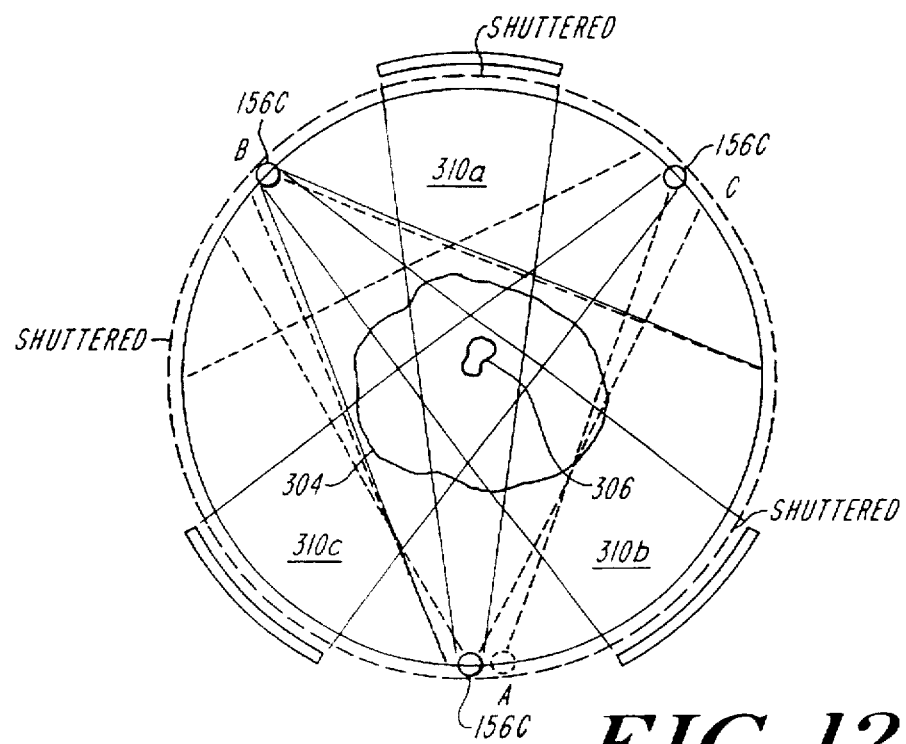
FIG. 12 illustrates selective projection processing and a preferred embodiment of blocking radiation, in accord with the invention, during a patient pre-screening operation.

FIG. 12 illustrates an example of such a medical application of the present invention. Specifically, three projections 210a–c are illustrated at differing unique angular locations of the focal spot 156A. A suitable system, such as the system described in U.S. Pat. No. 5,432,339, entitled Apparatus for and Method of Measuring Geometric, Positional and Kinematic Parameters of a Rotating Device Having a Plurality of Interval Markers issued Jul. 11, 1995 in the names of Bernard M. Gordon, Douglas Abraham, David Winston and Paul Wagoner, and assigned to the present assignee (Attorney's Docket No. ANA-21), the patent being incorporated herein by reference, for sensing the position of focal spot 156A can be used to either determine and control when the X-ray tube is pulsed, so that it is pulsed only when the focal spot 156A is at the desired positions of the three projections 210a–c. Alternatively the sensing system can be used to interpose a shutter over the X-ray source in between the three projection positions the focal spot 156C indicated at A, B and C. When full CT images are desired the X-ray source may be powered in a well known manner so that data is acquired for full CT images. In this case the location of the body where the pressuring data was taken can be noted, and the platform returned to that location that the full scan can be performed.

In summary, the systems described provide high speed scanning including pre-screening for each item passing through the system, without the necessity of generating full CT reconstructive images, and which reduces or overcomes the problems associated with the prior art. Specifically, the CT scanning system provides large volume, high speed scanning which includes pre-screening each scanned item, without the disadvantages of the In Vision Machine. The machine can be adapted to detect targets having specific target signatures, and it thus useful as a baggage scanner capable of detecting such targets as firearms and sheets of plastic explosives, and has other uses such as detecting metastasized tumors in patients. The system provides a methodology for generating selected CT reconstructed images based upon select projection data acquired during the CT scan. The system reduces the electromechanical complexity of prior art systems, such as the In Vision Machine, utilizing a separate pre-scan station and a CT scan station. By providing pre-screening intelligence fewer reconstructive CT images are required for the same level of security protection. As a result overall time to assess the contents of closed objects such as baggage through CT scanning is reduced without reducing the accuracy of the security inspection. Further the specific projection angles used in the pre-screening process can be user selected.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

19

What is claimed is:

1. A CT scanning system of the type for generating projection data of at least a portion of an object disposed within the system for each of a pretermined number N projections at corresponding N projection angles for each scan of the object, said system further comprising:
   pre-screening processor means for processing pre-screen data for each of a predetermined number of M projections at M projection angles, wherein $2 \leq M < N$; and
   analyzer means for analyzing said processed pre-screened data to determine whether there is a likelihood of the presence of a physical attribute within the location of the object being scanned.

2. A CT scanning system according to claim 1, further including CT image reconstruction processor means for processing said projection data so as to generate CT image reconstruction data.

3. A CT scanning system according to claim 2, wherein said CT image reconstruction processor means is responsive to said analyzer means so as to generate CT image reconstruction data when said analyzer means determines that there is a likelihood of the presence of a physical attribute within the location of the object being scanned.

4. A method of determining the presence of a metastasized tumor within a portion of a human body, said method comprising the steps of:
   (a) positioning the portion of the human body within a CT scanner and generating at least two projection views through the portion of the body;
   (b) determining from the projection views whether there is a likelihood of the presence of said tumor within the portion of the body being scanned; and
   (c) generating one or more full CT reconstructed images of the portion of the body being scanned when it is determined from the projection views that there is a likelihood of the presence of said tumor within the portion of the body being scanned.

5. A medical CT imaging system for scanning a patient to determine the presence of a target that (i) may be disposed with in the patient and (ii) has a target signature associated with a measurable physical attribute, said system comprising:
   a source of X-rays;
   a detector system for receiving X-rays from said source during a scan so as to define a beam of X-rays between the source and the detector system;
   rotation means for rotating at least the source about a rotation axis so that said source moves through a predetermined number N of projection angles with each rotation of said source so as to provide an X-ray projection of the patient disposed in said beam onto said detector system at each of said projection angles;
   support means for supporting the patient between the source and detector system;
   means for moving the support means and the rotation means relative to one another in a direction parallel to said rotation axis so as to volumetrically scan said patient;
   data acquisition means, cooperative with said detector system, for acquiring projection data as a function of said physical attribute for each of said projections of the patient disposed in said beam onto said detector system at each of said projection angles; and
   processor means for processing said acquired data as a function of said physical attribute, said processor

20 means including pre-screening means for processing pre-screened data which is that data acquired when said source is at a preselected number M of said N projection angles, wherein $2 \leq M < N$, to determine whether there is a likelihood of the presence of said target within the object being scanned.

6. A CT scanning system for scanning an object to determine the presence of a target that (i) may be disposed within the object and (ii) has a target signature associated with a measurable physical attribute, said system comprising:
   (a) a source of X-rays;
   (b) a detector system for receiving X-rays from said source during a scan so as to define a beam of X-rays between the source and the detector system;
   (c) rotation means for rotating at least the source about a rotation axis so that said source moves through a predetermined number N of projection angles with each rotation of said source so as to provide an X-ray projection of an object disposed in said beam onto said detector system at each of said projection angles;
   (d) data acquisition means, cooperative with said detector system, for acquiring projection data as a function of said physical attribute for each of said projections of an object disposed in said beam onto said detector system at each of said projection angles; and
   (e) processor means for processing said acquired data as a function of said physical attribute, said processor means including pre-screening means for processing pre-screened data which is that data acquired when said source is at a preselect number M of said N projection angles, wherein $2 \leq M < N$, to determine whether there is a likelihood of the presence of said target within the object being scanned.

7. A CT scanning system according to claim 6, said system further including means for selectively displaying each of M projections from which said pre-screened data is acquired.

8. A CT scanning system according to claim 6, further including dual energy source means for energizing said source at two different energy levels.

9. A CT scanning system according to claim 6, wherein said pre-screening means includes indication means for providing an indication when the pre-screened data indicates there is a likelihood of the presence of said target within the location of the object being scanned.

10. A CT scanning system according to claim 9, wherein said processor means further includes image reconstruction processing means for processing the projection data acquired by said data acquisition means from all of the projections of an object disposed in said beam for all of said projection angles N so as to generated CT reconstruction image data.

11. A CT scanning system according to claim 10, further including means for displaying a CT reconstruction image as a function of the CT reconstruction image data.

12. A CT scanning system according to claim 10, wherein said image reconstruction processing means processes the projection data acquired by said data acquisition means for all of said projections of said object for all off said projection angles N when said indication means provides an indication that there is a likelihood of the presence of said target within the location of the object being scanned.

13. A CT scanning system according to claim 12, further including means for controlling said system so that said data acquisition means initially only acquires said pre-screened

21 data, said indication means indicates each location in the object that there is likelihood of the presence of said target; and means for rescanning those locations in the object so indicated.

14. A baggage scanner for sequentially scanning a plurality of said objects and including the CT scanning system of claim 6, and further including conveying means for transporting a plurality of said objects to be scanned in sequence between said X-ray source and detector system.

15. A CT scanning system for scanning an object to determine the presence of a target that (i) may be disposed within the object and (ii) has a target signature associated with a measurable physical attribute, said system comprising:

(a) a source of X-rays;
(b) two-dimensional detector array for receiving X-rays from said source during a scan so as to define a beam of X-rays between the source and the detector array;
(c) rotation means for rotating at least the source about a rotation axis so that said source moves through a predetermined number N of projection angles with each rotation of said source so as to provide an X-ray projection of an object disposed in said beam onto said detector array at each of said projection angles;
(d) data acquisition means, cooperative with said detector array for acquiring projection data as a function of said physical attribute for each of said projections of an object disposed in said beam onto said detector array at each of said projection angles; and
(e) processor means for processing said acquired data as a function of said physical attribute, said processor means including pre-screening means for processing pre-screened data which is that data acquired when said source is at a preselected number M of said N projection angles, wherein $2 \leq M < N$, to determine whether there is a likelihood of the presence of said target within the object being scanned.

16. A CT scanning system for scanning an object to determine the presence of a target that (i) may be disposed within the object and (ii) has a target signature associated with a measurable physical attribute, said system comprising:

a source of X-rays;
a detector system for receiving X-rays from said source during a scan so as to define a beam of X-rays between the source and the detector system;
rotation means for rotating at least the source about a rotation axis so that said source moves through a predetermined number N of projection angles with each rotation of said source so as to provide an X-ray projection of an object disposed in said beam onto said detector system at each of said projection angles;
data acquisition means, cooperative with said detector system, for acquiring projection data as a function of said physical attribute for each of said projections of an object disposed in said beam onto said detector system at each of said projection angles;
means for storing the projection data acquired for at least N projection angles;
means for selecting pre-screened data from said projection data, said pre-screened data being data acquired when said source is at a preselected number M of said N projection angles, wherein $2 \leq M < N$; and
processor means for processing said acquired data as a function of said physical attribute, said processor means including:

22 pre-screening means for processing the pre-screened data to determine whether there is a likelihood of the presence of said target within the object being scanned, said pre-screening means including indication means for providing an indication when the pre-screened data indicates there is a likelihood of the presence of said target within the location of the object being scanned, and image reconstruction processing means for processing the projection data acquired by said data acquisition means for all of the projections of said object disposed in said beam for all of said projection angles N so as to generate CT reconstruction image data when said indication means provides an indication that there is a likelihood of the presence of said target within the location of the object being scanned.

17. A CT scanning system for scanning an object to determine the presence of a target that (i) may be disposed within the object and (ii) has a target signature associated with a measurable physical attribute, said system comprising:

(a) a source of X-rays;
(b) a detector system for receiving X-rays from said source during a scan so as to define a beam of X-rays between the source and the detector system;
(c) rotation means for rotating at least the source about a rotation axis so that said source moves through a predetermined number N of projection angles with each rotation of said source so as to provide an X-ray projection of an object disposed in said beam onto said detector system at each of said projection angles;
(d) data acquisition means, cooperative with said detector system, for acquiring projection data as a function of said physical attribute for each of said projections of an object disposed in said beam onto said detector system at each of said projection angles; and
(e) processor means for processing said acquired data as a function of said physical attribute, said processor means including pre-screening means for processing pre-screened data which is that data acquired when said source is at a preselected number M of said N projection angles, wherein $2 \leq M < N$, to determine whether there is a likelihood of the presence of said target within the object being scanned, the preselected number and location of said M projection angles being selectable by an operator of the system from said N projection angles.

18. A CT scanning system of the type for generating projection data of at least a portion of an object disposed within the system for each of a predetermined number N projections at corresponding N projection angles for each scan of the object, said system further comprising:

means for acquiring said projection data;
pre-screening processor means for processing pre-screen data for each of a predetermined number of M projections at M projection angles, wherein $2 \leq M < N$;
means for preselecting said pre-screen data from said projection data;
analyzer means for analyzing said processed pre-screened data to determine whether there is a likelihood of the presence of a physical attribute within the location of the object being scanned; and
CT image reconstruction processor means for processing said projection data so as to generate CT image reconstruction data.

19. A method of determining the presence of a target within a containing volume of an object, said method comprising the steps of:

positioning the object within a CT scanner, said CT scanner being of the type for generating projection data of at least a portion of the object, said projection data comprising N projections at corresponding N projection angles for each full scan of the object;

using the CT scanner, generating at least two and fewer than N pre-screening projection views through at least a portion of the object;

determining from the at least two and fewer than N pre-screening projection views whether there is a likelihood of the presence of said target within the portion of the object being scanned; and generating one or more full CT reconstructed images of the portion of the object being scanned when it is determined from the at least two and fewer than N pre-screening projection views that there is a likelihood of the presence of said target within the portion of the object being scanned.

20. A method according to claim 19, further including the step of displaying one or more of the projection views, separately or in combination, onto a display terminal.

21. A method according to claim 19, wherein the target is a metastasized tumor and wherein the object is a human body or portions thereof.

22. A method according to claim 19, wherein the target is a dangerous object and wherein the object is an item of baggage or portions thereof.

23. A method according to claim 22, wherein said dangerous object is a sheet of plastic explosive.

24. A CT scanning system of the type for generating projection data of at least a portion of an object disposed within the system for each of a predetermined number N projections at corresponding N projection angles for each scan of the object, said system further comprising:

pre-screening processor means for processing pre-screen data for each of a predetermined number of M projections at M projection angles, wherein $2 \leq M < N$ and wherein said M projection angles are selected from said N projection angles; and analyzer means for analyzing said processed pre-screened data to determine whether there is a likelihood of the presence of a physical attribute within the location of the object being scanned.

* * * * *

UNITED STATES PATENT AND TRADEMARK OFFICE
CERTIFICATE OF CORRECTION

PATENT NO.: 5,796,802

DATED: August 18, 1998

INVENTOR(S): Bernard M. Gordon

It is certified that error appears in the above-identified patent and that said Letters Patent is hereby corrected as shown below:

Claim 12, column 20, line 61, delete "off" and subtitute therefor -- of --.

Signed and Sealed this

Twenty-ninth Day of December, 1998

*Attest:*

BRUCE LEHMAN

*Attesting Officer*   *Commissioner of Patents and Trademarks*